(No Model.)

H. B. SCOVELL.
BICYCLE.

No. 515,449. Patented Feb. 27, 1894.

Witnesses
C. C. Burdine
Howard P. Wilson

Inventor
Halsey B. Scovell
per John G. Manahan
his Attorney

THE NATIONAL LITHOGRAPHING COMPANY,
WASHINGTON, D. C.

UNITED STATES PATENT OFFICE.

HALSEY B. SCOVELL, OF DIXON, ILLINOIS.

BICYCLE.

SPECIFICATION forming part of Letters Patent No. 515,449, dated February 27, 1894.

Application filed August 29, 1892. Serial No. 444,413. (No model.)

*To all whom it may concern:*

Be it known that I, HALSEY B. SCOVELL, a citizen of the United States, residing at Dixon, in the county of Lee and State of Illinois, have invented certain new and useful Improvements in Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to improvements in bicycles, having more special application to the peculiar construction and operation of the pedal sprocket wheel therein.

The two-fold purpose of my invention is, first, to impart the maximum velocity to said driving wheel at that portion of the rotation of said pedal wheel where the rider has the greatest power over said wheel. And, second, to reduce the diameter of said pedal wheel, between said points, so that the portions of the pedal wheel in contact with the driving chain at said intervals, may pass rapidly over the spaces between the aforesaid points. There being two pedal cranks on said pedal wheel projected oppositely, there will be two of the aforesaid utilized draft arcs to each revolution of the pedal wheel, and also two of said depressed portions of the periphery of said wheel, immediately following, respectively, the aforesaid draft arcs.

My purpose, further, is to decrease the objections to an oblong or elliptical wheel, which, carrying differing lengths of the driving chain upon its periphery, at different points in its rotation, has the effect of producing an alternate slackness and tautness in said driving chain, which not only results in irregularity in action, but such slackness delays the passage of the pedal wheel between its power portions, because the rear ground wheel must first take up such slack, before it will rotate the pedal wheel from one power portion to the other.

As my invention has reference only to the form and operation of the pedal wheel, and is applicable to any of the types of bicycles or tricycles in common use, and as the residue of the construction of said vehicles is well known, I do not deem it necessary to show or describe the entire machine, or any more thereof, than will render intelligible the construction and operation of my improvement.

I attain the objects aforesaid by the mechanism illustrated in the accompanying drawings, in which—

Figure 1:
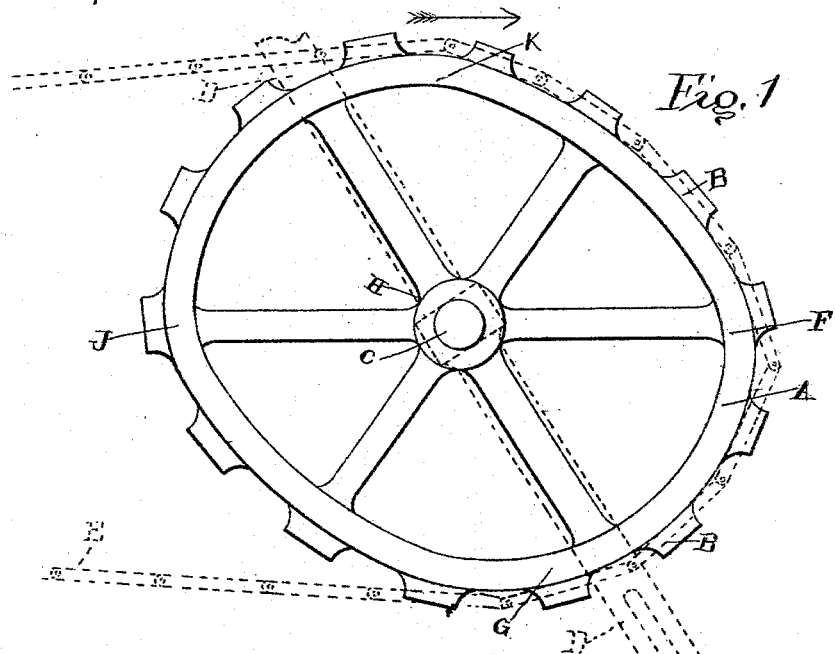
Figure 2:
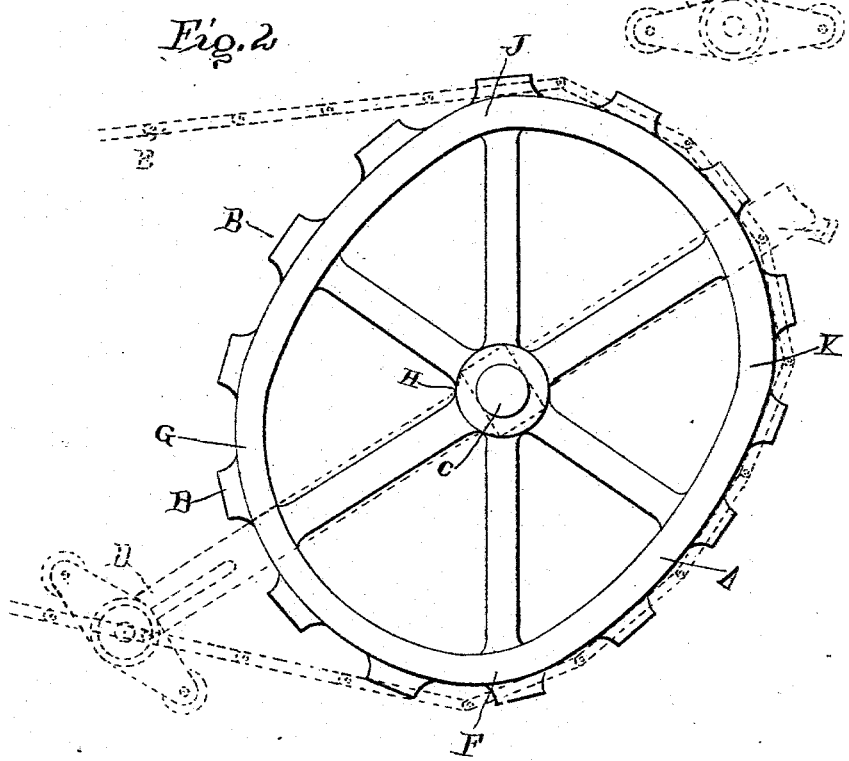

Figure 1 represents the position of my improved wheel at that point in its rotation when one of the power arcs is entering the initiate of its action to draw the driving chain at its maximum velocity. Fig. 2 represents the said wheel at that point in its rotation where one of the non-power arcs is beginning to engage the chain, when the momentum of the rear ground wheel through the medium of the driving chain, rotates the pedal wheel to the next power arc of the latter.

Similar letters refer to similar parts throughout the several views.

A is the usual pedal sprocket wheel of the ordinary bicycle, provided peripherally with sprockets B. The wheel A is suitably keyed on the driving axle C, on which latter there are also rigidly seated the oppositely projecting pedal levers D, D.

E is the sprocket chain, carried on and progressed by the wheel A, and having suitable operative connection toward the rear of the machine, with the usual sprocket wheel rigidly seated on the axle of the rear ground or driving wheel.

The quality of my invention is such that its usefulness is not limited to bicycles simply, nor to any special type of the latter, and the description herein is intended merely to exhibit one method of the application of my invention, its application in other analogous situations being practicable, with obvious changes. The wheel A may be considered as being constructed peripherally of four alternating segments, or arcs, each alternate and oppositely seated segment having the same radius, but all of said arcs being eccentric to the hub of the pedal wheel. The proportion between these different arcs may vary, and will be here given only approximately, the value of the construction being not restricted to any one certain size or proportion.

In Fig. 1 the arrow at the top of the wheel A indicates the direction of the rotation of the latter.

Referring to Fig. 1, it will be noticed that, following the rotation of the wheel, the periphery of the wheel A from F at the front of the wheel, to G at the bottom thereof, is farther from the common hub H than the portion from G to J, and that the portion from J to K corresponds to the portion from F to G aforesaid, and is farther from the hub H than the parts from G to J and from K to F. For perspicuity of description, the arc from F to G and the opposite arc from J to K are herein denominated the "power arcs," and the arcs from G to J and from K to F the "non-power arcs." Both the power arcs and non-power arcs are set eccentrically to the hub H. With the wheel revolving as shown, the rear end of the power arc is farther from said hub than is the forward end of said power arc, and the forward end of the non-power arc is farther from the hub than is the rear end of such non-power arc. The pedals D project radially from hub H beyond the periphery of the wheel A, at a point about midway, respectively, of the power arcs F G and J K. From the position of the rider, and co-action of pedals D, the points in the rotation of the wheel A, at which he can exert the greatest power thereon, are when the power arcs are passing down the front of the wheel A. This, of course, occurs once with each power arc in each rotation of the wheel A, and it is also true that in each rotation, as each pedal D passes up the rear portion of the wheel A, the rider is incapable of exerting any power on said pedal. Also when the pedals are respectively passing the upper and lower parts of the wheel the rider can exert no force. The purpose, therefore, is to place the power arcs F G and J K, farther from the center of the wheel A, so as to give said arcs a longer sweep, and thereby impart the maximum velocity to the chain E, during that portion of the rotation of the wheel A in which the rider exerts his maximum force upon the pedals D, and to have the wheel pass quickly over said upper and lower dead points, and to the latter end the non-power arcs G J and K F are placed at a less distance from the hub H, and, being shorter, pass rapidly under the chain E, whereby the alternations from one power arc in the wheel A to the other, are rendered more rapid than if the wheel A had a continuous periphery as remote from the hub H as the arcs F, G, J, K.

The advantage in my form of pedal wheel over an elliptic pedal wheel, consists in the fact that in mine the power arcs are longer in proportion to the non-power arcs than in the elliptic. Also a greater proportion of the periphery of my wheel can be utilized for power.

My non-power arcs have as short a radius in, proportion to that of my power arcs, as does the elliptic wheel. The advantages of my arcs being set eccentric to the hub, as aforesaid, are, first, that the rear end of the power arcs being farthest from the hub, the velocity of the pedal wheel is gradually increased during the working interval of such power arc; and, second, the forward end of the non-power arc being farthest from the hub, the chain does not fall suddenly toward the hub, at the initiate of such non-power arc passing under the chain, as is the case with the elliptic wheel.

The operation of my invention is as follows:—It will be noticed that only the upper half of the front half of the wheel A exerts any drawing quality upon the chain E. Therefore, as the power arcs F G and J K pass, respectively, from the upper side of the wheel A to the extreme front of the latter, the surface velocity of the wheel A is at its maximum, imparting, of course, the maximum velocity to the chain E, and at the same time the pedals D are respectively traversing that portion of their orbital movement, during which the rider has his maximum power over the wheel A, as aforesaid. This, of course, gives the machine its maximum velocity. As the rear ends of the power arcs F, G, J, K pass beyond the top of wheel A, the chain E gradually drops back upon the non-power arcs G J and F K, respectively. The length of said non-power arcs being less than that of the power arcs, and there being substantially no slackness of chain E in the pedal wheel passing from a power arc to a non-power arc, whereby chain E continues in substantially the same velocity, the non-power arcs pass, respectively, comparatively quicker under the chain E, and the next succeeding power arc is brought sooner into operation.

I do not desire to limit myself to placing the arcs eccentrically to the hub, but

What I claim as my invention, and desire to secure by Letters Patent of the United States, is—

In a pedal motor wheel A, a tractional periphery, consisting of eccentric power arcs F G and J K, placed at a greater distance from the common hub H than the intermediate non-power arcs G J, K F; said power arcs having their rear ends, and said non-power arcs their forward ends, farthest from said hub; substantially as shown, and for the purpose described.

In testimony whereof I affix my signature in presence of two witnesses.

HALSEY B. SCOVELL.

Witnesses:
HENRY C. WARD,
JOHN G. MANAHAN.